Nov. 4, 1958  D. ATLAS  2,859,437
RADAR CONTOUR MAPPING DEVICE
Filed Oct. 12, 1954  5 Sheets-Sheet 1
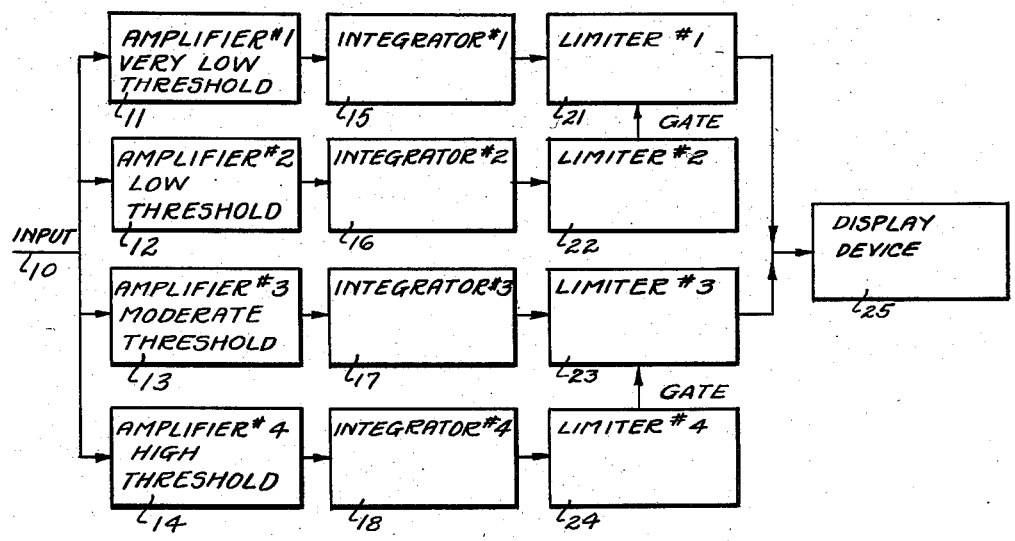
*Fig. 1.*
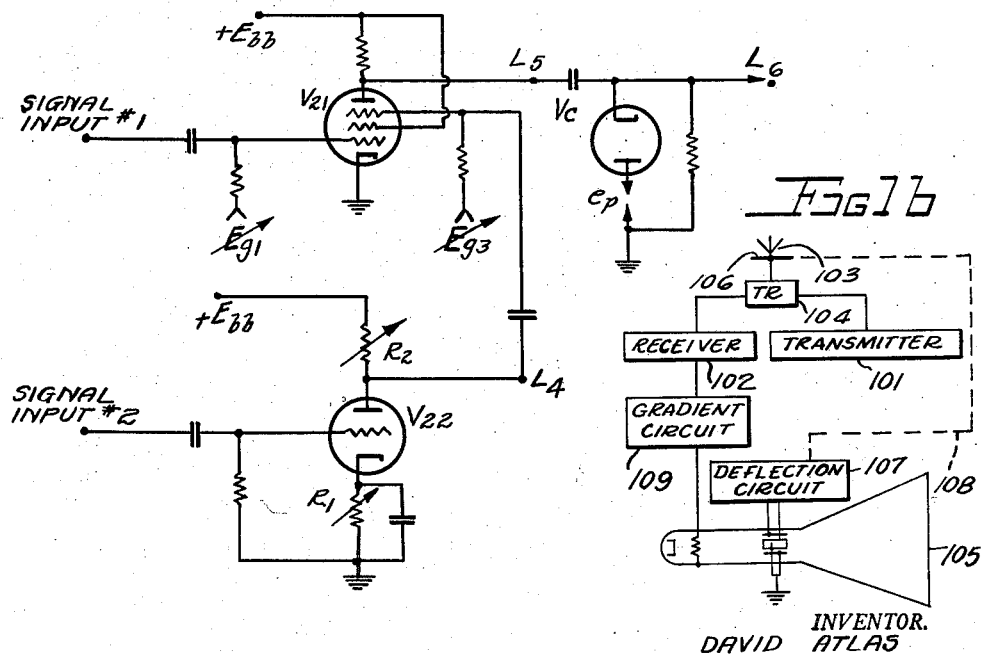
*Fig. 1a.*  *Fig. 1b*
INVENTOR.
DAVID ATLAS
BY
DONALD C. KEAVENEY
AND
Wade Keavney
ATTORNEYS

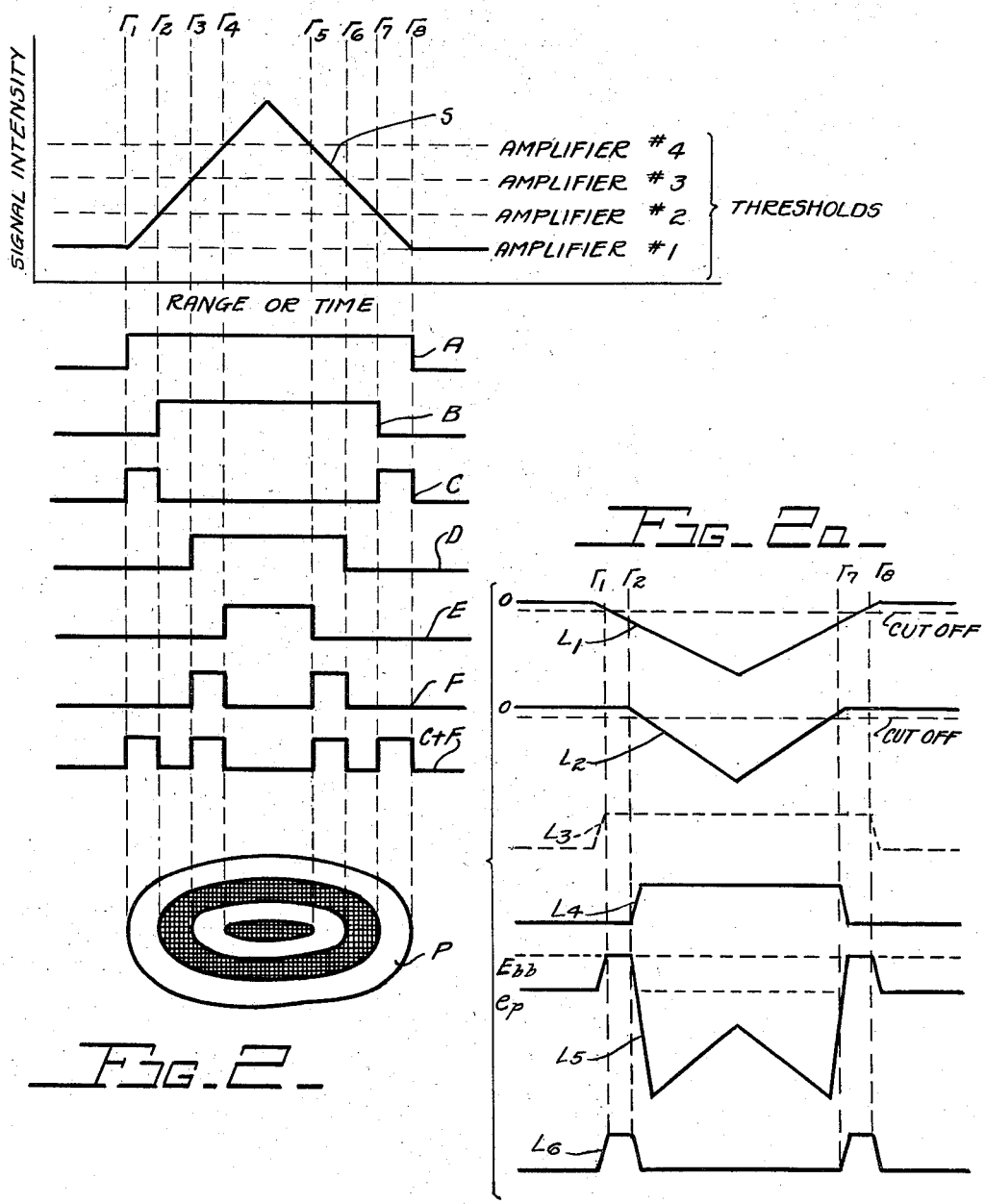

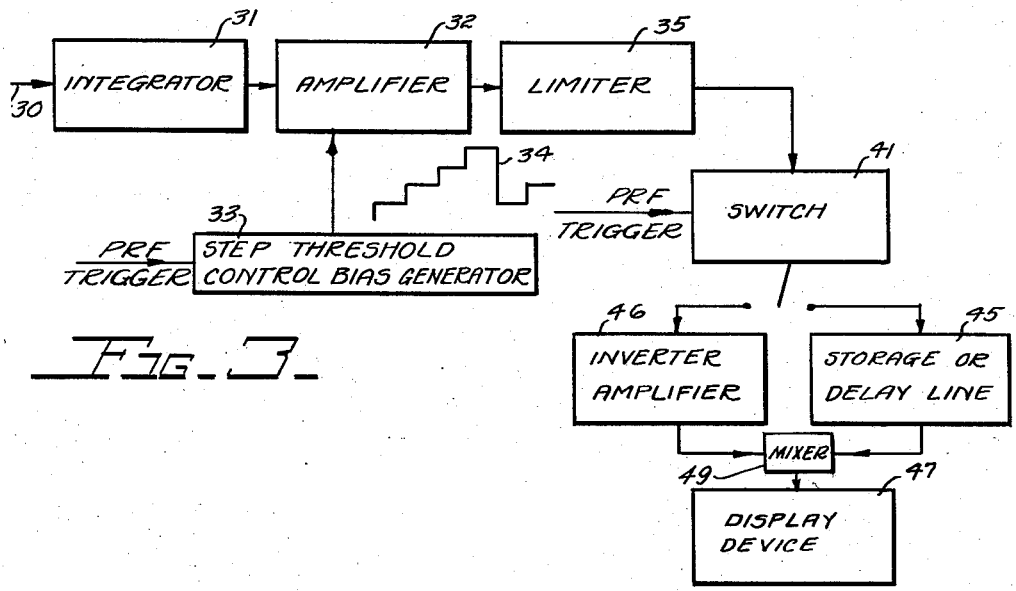
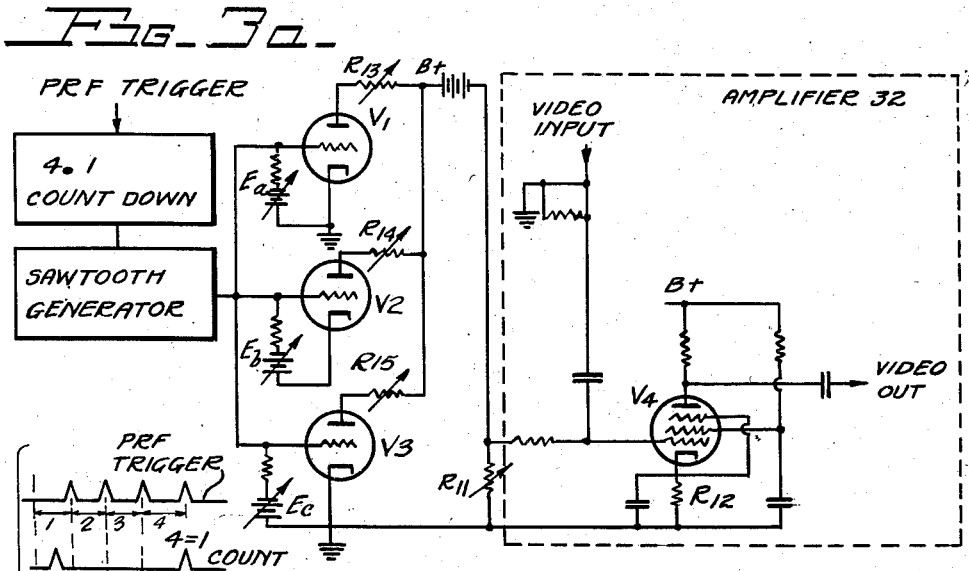

Nov. 4, 1958 D. ATLAS 2,859,437
RADAR CONTOUR MAPPING DEVICE
Filed Oct. 12, 1954 5 Sheets-Sheet 4
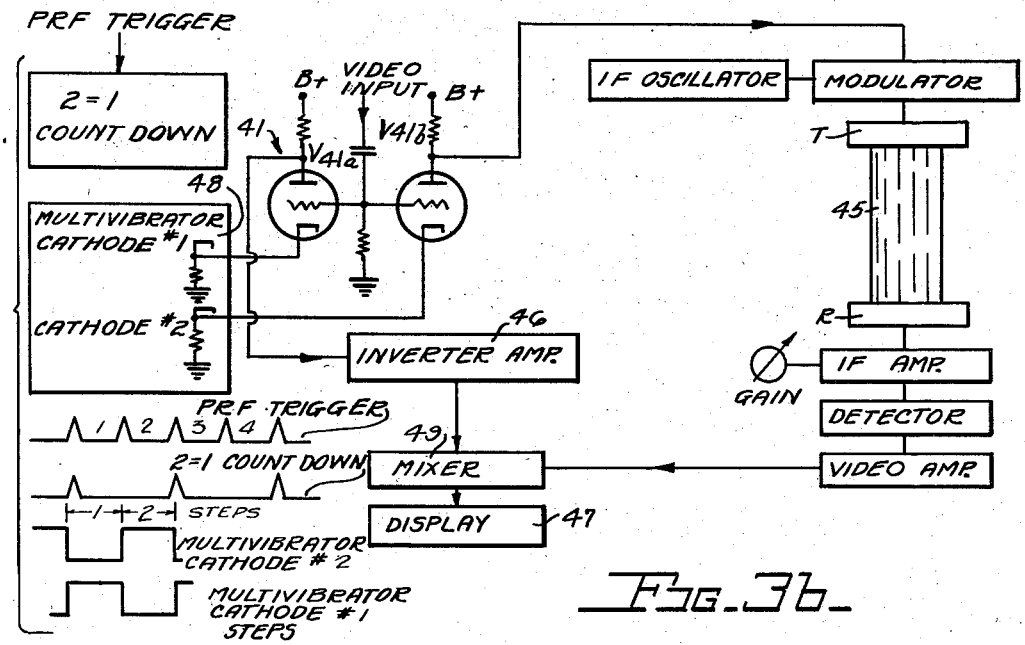
*Fig. 3b*
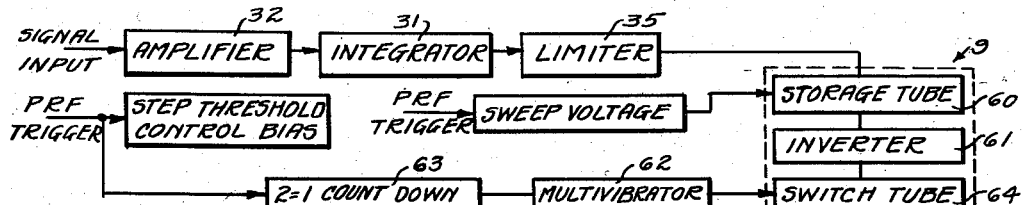
*Fig. 4*
*Fig. 4b*
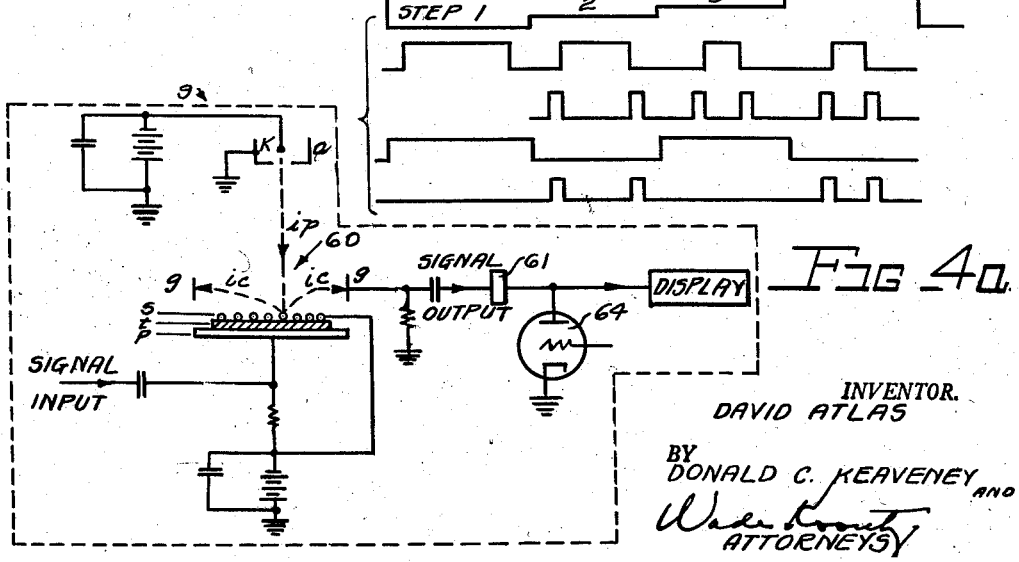
*Fig. 4a*
INVENTOR.
DAVID ATLAS
BY
DONALD C. KEAVENEY
AND
ATTORNEYS

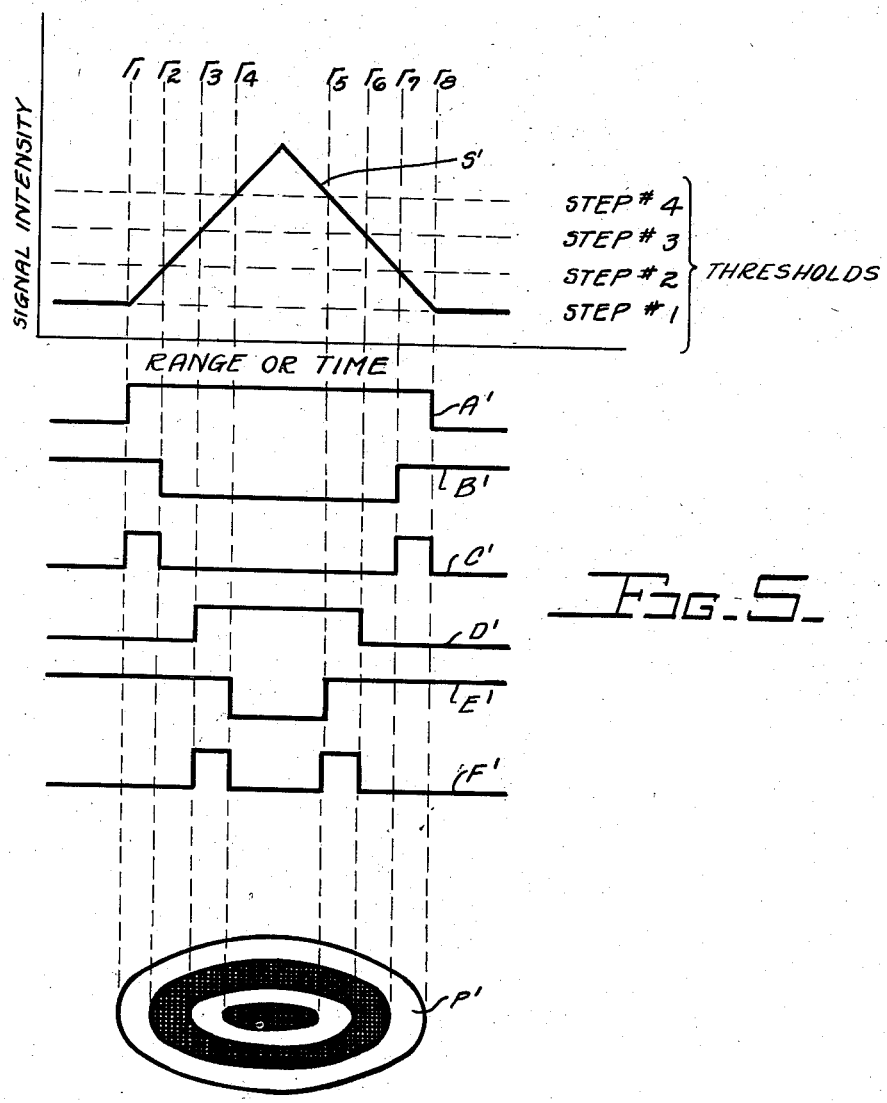

United States Patent Office 2,859,437
Patented Nov. 4, 1958

2,859,437

RADAR CONTOUR MAPPING DEVICE

David Atlas, Newton Center, Mass.

Application October 12, 1954, Serial No. 461,944

12 Claims. (Cl. 343—11)

(Granted under Title 35, U. S. Code (1952), sec. 266)

The invention described herein may be manufactured and used by or for the United States Government for governmental purposes without payment to me of any royalty thereon.

This invention relates to an improvement over the radar storm contour mapping device disclosed in my U. S. Patent No. 2,656,531, which issued on October 20, 1953 and which discloses the use of a radar system for plotting contour maps of rain storm intensities as a function of two geographical coordinates. This system depends upon the fact that the intensity of the reflected radar pulse and hence of the voltage induced in the receiving antenna varies as a direct function of the density or intensity of the reflecting raindrops. These reflected pulses are then fed through a modified radar receiver which may have any even number of separate I. F. or video channels in parallel. Each succeeding channel has a gain which is somewhat greater than that of the immediately preceding channel. The differentially amplified signals are then fed to corresponding parallel video channels each of which includes a limiter stage. The output of limiter No. 1 is fed to a video inverter and the output of limiter No. 2 is fed to a video mixer which combines the channel No. 2 output with that from the inverter in channel No. 1 so that the difference in amplitude of the signals passing through channels No. 1 and No. 2 may be fed to the cathode ray tube or other indicating device. This same procedure may be carried out for any desired number of pairs of channels in parallel and results, in a P. P. I. display, in a series of bright and dark bands which is in effect a contour map plot of the observed storm intensity.

The present invention relates to an improved system for accomplishing the same effect without necessarily requiring the alternate inversion and addition of signal outputs from adjacent channels and without necessarily requiring more than one channel.

It is an object of this invention to provide an improved and simplified radar storm contour mapping system.

It is a further object of this invention to provide a contour mapping system in which only a single amplifier-limiter channel is required.

These and other objects and advantages are achieved by applying a control or bias signal to an amplifier-limiter channel or channels in the radar receiver. In the case of a single channel system the bias may be derived from a separate step threshold generator which sequentially alters the channel's cut-off level, or in a multichannel system the bias for one channel may be derived from the output of the limiter of the adjacent channel. The outputs of the multichannel system are then fed directly to a display device. In the single channel system the outputs from alternate steps are fed one to a storage or delay device and the next directly to the display device in order to produce the bands forming the contour map.

The above and other objects and advantages will be more fully described and illustrated in the following specification and drawings forming a part thereof in which:

Fig. 1 is a block diagram of a multichannel circuit for use in the present system.

Fig. 1a is a schematic circuit diagram of adjacent limiter stages shown in Fig. 1.

Fig. 1b is a schematic circuit diagram of a radar storm contour mapping device according to the invention.

Fig. 2 is a diagrammatic showing of the waveforms resulting from the operation of the circuit of Fig. 1.

Fig. 2a is a diagrammatic showing of the waveforms existing at various points in the circuit of Fig. 1a.

Fig. 3 is a block diagram of a single channel system for use in the present invention.

Fig. 3a is a schematic diagram of the step threshold control bias generator and amplifier of Fig. 3 including diagrammatic waveforms therefor.

Fig. 3b is a schematic diagram of the switch and delay line of Fig. 3.

Fig. 4 is a block diagram of a modification of the circuit of Fig. 3.

Fig. 4a is a circuit schematic of the switching and display circuit of Fig. 4.

Fig. 4b shows waveforms existing at various points in Fig. 4.

Fig. 5 is a diagrammatic showing of the waveform resulting from the operation of the circuit of Figs. 3 and 4.

The present invention is intended for use in any conventional radar system which has provision for a two dimensional intensity modulated indicator display as shown in Fig. 1b of the drawing. Such a system normally consists of a transmitter 101 and receiver 102 of pulses of electromagnetic energy which are reflected by the target desired to be located or mapped. By the use of a TR tube 104, one antenna 103 may serve for both transmitting and receiving. The angle of sweep of the electron beam in the display device 105 is normally controlled in accordance with the angular position of the antenna and the beam sweep is synchronized with the pulse transmission frequency so that an indication of both bearing and range are presented on the display device. The antenna 103, which transmits and receives the electromagnetic radar signals is oriented by means of the platform 104 which is tied to the deflection means 107 by any well-known means which is shown schematically as 108 so that the angular position of the antenna is synchronized with the sweep of the beam. The present invention adds to this conventional system, a means 109 for indicating the gradient of signal intensity and hence target reflectivity as well as the usual showing of target range and bearing.

Referring now to Fig. 1, 10 designates the input line to what is illustratively shown as a four channel system. It is of course understood that the system may have any even number of channels such as 2, 4, 6, etc. but a four channel system is shown for clarity of discussion. The input 10 may for example come from the front end or the detector following the I. F. section of a radar unit being used for storm detection. The waveform of the envelope of the input signal at 10 is represented schematically by waveform S in Fig. 2 wherein the ordinate represents signal intensity and the absissa represents time or its equivalent in range. The waveform S is a schematic representation of the envelope of the storm signals or echoes which return from one transmitted pulse of the radar system. Hence this signal S represents the input for one sweep of the electron beam in the display device which is synchronized with the radar unit in the usual and conventional manner.

The signal input from 10 is sent to parallel amplifier-limiter channels here shown as being four in number. Each channel has a higher threshold of detectability or cutoff level than the channel immediately above it in Fig. 1. This effective threshold or cutoff level may be accomplished either by biasing the various amplifiers to different levels below cutoff, or by stepwise reduction of the gain of the various amplifiers. This would be a stepwise reduction downward as the channels are shown in Fig. 1. For example, the effective thresholds of channels 1, 2, 3, and 4 of Fig. 1 are indicated by the dashed voltage levels on the plot of the waveform S in Fig. 2. Thus the input to amplifier 11 of channel 1 exceeds its threshold of detectability between ranges $r_1$ and $r_8$ as seen in Fig. 2. Hence signal is passed to limiter 21 of channel 1 at all ranges or times between $r_1$ and $r_8$ when the input signal has the form shown at S. The actual form of the input signal will of course be determined by the reflectivity of the targets from which it is returned, but the triangular form shown at S is used here for purposes of illustration.

An integrator 15 may be inserted between amplifier 11 and limiter 21 of channel 1 in order to overcome the effect of fluctuation of actual storm or cloud signals. The integrator may be a simple and conventional R-C circuit. Similar integrating units are also shown at 16, 17 and 18 for each of channels 2, 3 and 4, respectively. These four integrator circuits could obviously be replaced by a single integrator in the input line 10 prior to the parallel amplifiers. In either position the use of an integrating circuit is optional and is not critical or necessary to the operation of the system. Its use tends to improve the circuit performance when the input signal is fluctuating in an irregular manner throughout one cycle.

The amplifier 11 and integrator 15 will pass signal to limiter 21 for all values of input signal which are above the level of the threshold of detectability for channel 1. Thus signal is passed to limiter 21 at all ranges or times between $r_1$ and $r_8$ as seen in Fig. 2 and the output of limiter 21 alone would be as shown by waveform A.

Simultaneously, however, amplifier 12 of channel No. 2, having a slightly higher threshold of detectability, passes signal to limiter 22 between the ranges $r_2$ and $r_7$ as seen in Fig. 2. These ranges are determined by the higher threshold of channel 2 and produce an output from limiter 22 as represented by waveform B. The output of limiter 22 is used to gate limiter 21 so that the latter is turned on very sharply during the range or time in which the input signal to the parallel channels exceeds the higher threshold of channel No. 2, limiter 21 having been cut off by its own input signal prior to application of the gating signal from limiter 22. The final output of limiter 21 when biased by the output of limiter 22 is shown by waveform C.

One typical circuit which may be used to gate limiter 21 by the output of limiter 22 is shown in Fig. 1a by way of example only since there are obviously many equivalent methods of performing this function. In Fig. 1a, $V_{21}$ is limiter 21 and $V_{22}$ is limiter 22. $V_{21}$ may be a sharp cutoff pentode biased by $E_{g1}$ just above cutoff with quiescent plate voltage $e_p$. $V_{22}$ is also biased just above cutoff by $R_1$. Signal inputs to $V_{21}$ and $V_{22}$, having been inverted by amplifiers 11 and 12, are shown as L1 and L2 respectively in Fig. 2a. The output at point L5 of $V_{21}$ would ordinarily be a limited signal as shown in dotted lines at L3 in Fig. 2a if no gate were applied from $V_{22}$. However, the limited output L4 of $V_{22}$ is applied as a gating signal to the suppressor or control grid of $V_{21}$. This gating signal may be adjusted in amplitude by varying $R_2$ until it is strong enough to cause $V_{21}$ to conduct very strongly so that the output suddenly drops well below $e_p$ as seen in waveform L5 at time $r_2$. In this conducting condition the input signal to $V_{21}$ then causes the output voltage L5 to start rising. However, the amplitude of the input signal, the gain of $V_{21}$, and the amplitude of the biasing or gating signal must all be optimized so that the output at L5 does not again exceed $e_p$ between times $r_2$ and $r_7$. $V_C$ then acts as a clamper or clipper with plate adjusted to $e_p$ to short the output whenever it drops below $e_p$. The final output at point L6 is therefore the part of waveform L5 which exceeds $e_p$ and is shown both at L6 in Fig. 2a and at C in Fig. 2.

In effect, limiter 21 passes signal to the display tube 25 only when the input signal at 10 exceeds the threshold of amplifier 11 but does not exceed the threshold of amplifier 12, thus establishing the upper and lower boundary values for a range or class of echo intensities. As the antenna beam scans through the storm cell or cloud in azimuth, or alternatively in elevation, the pass band output of limiter 21 energizes the intensity control grid of the display tube 25 in a positive manner and produces a normally white band on the plan position display as shown at P in Fig. 2 which band corresponds to the lowest class of echo intensity and hence to the area in which the storm intensity is a minimum. Tube 25 may be the same as that shown in Fig. 1b.

In a two-channel system the region of the storm producing echo intensity in excess of the channel 2 threshold would appear in a negative or normally black manner due to the usual negative bias of the intensity control grid of the display tube. The boundary line between the white and black areas is an isoecho line and hence is an accurate quantitative representation of the contour lines of equal storm intensity on the polar geographical plot of the P. P. I. display. The numerical value of storm intensity represented by this line may be determined from the gain or threshold setting of the amplifier channels and a calibration chart of such settings plotted against correlated values of previously measured rain intensities.

Any desired number of contour lines or isoecho or equi-intensity lines may be displayed by adding additional pairs of channels. In the four channel system shown in Figs. 1 and 2, the two additional channels No. 3 and No. 4 containing amplifiers 13 and 14 and limiters 23 and 24 operate in a manner similar to that of channels No. 1 and No. 2 as described above. Thus, limiter 23 when gated by the output of limiter 24 passes signal to the display tube only when the input signal S at 10 exceeds the threshold of channel No. 3 but does not exceed the threshold of channel No. 4. In Fig. 2 the waveform output of limiter 23 when unbiased is shown at D while the output of limiter 24 is shown at E. The output of limiter 23 when gated by output from limiter 24 is shown at F. Waveforms C and F are applied simultaneously to the display device and produce the contour map shown at P in Fig. 2.

The threshold of detectability must of course progressively increase from channel No. 1 up to the last channel used by increments which determine the quantitative spacing of the contour lines. The output levels in the even numbered gate producing channels must be sufficient to produce a gate signal which can sharply turn on or blank out the limiters in the associated odd numbered channels. The output limiters 21, 23 then produce a series of white bands separated by an alternate series of dark bands on the plan position display as the radar beam scans through the entire region of the storm cell.

The final presentation on the P. P. I. display would appear as shown schematically at P in Fig. 2. Here the outside white band represents the lowest class of echo intensity; the adjacent dark band represents the next higher class of echo intensity; the second white band corresponds to a third or next higher class, and the inner black core corresponds to all higher intensities or to the core of the storm. The sharply defined boundary lines between adjacent bands are contour map lines of equal echo intensity.

If, as taught by my prior Patent 2,656,531, the incoming echoes from the target are first amplified by a sensitivity time control circuit to correct for variation of attenuation of the echo signal with distance of the target from the radar, and if they are then applied to the input 10 of the circuit of Fig. 1, the bands and contours of the P. P. I. display represent classes and contours of target reflectivity which are independent of the range of the targets.

Referring now to Figs. 3 and 5, there is shown a further improvement by means of which this same effect can be achieved by using a single amplifier channel and sequentially modulating its effective threshold in a number of steps equal to the number of channels which would be used in the multichannel contour mapping device, i. e., in any even number of steps equal to or greater than 2.

The signal input to the circuit of Fig. 3 which would appear at input terminal 30 is represented schematically by waveform S' of Fig. 5 in which the ordinate is signal intensity or voltage and the abscissa is range or its equivalent in time. The waveform S' is a schematic representation of the envelope of the storm or cloud signals. The effect of fluctuation in an actual storm or cloud signal may be overcome by passing the input signals through a simple R-C integrating circuit 31 here shown as prior to the amplifier 32. It is obvious that the integrator could also be placed after the amplifier. In either position, the use of the integrator 31 is optional in that it tends to improve but is not critical to the overall circuit performance.

The effective threshold of detectability or cut-off level of amplifier 32 is controlled in a stepwise fashion by the step threshold control bias generator 33. This generator may be of any conventional type which has an output as shown at 34. The stepwise variation of the threshold or cut-off level of amplifier 32 may be accomplished either by biasing the amplifier below cut-off in a stepwise fashion or by the stepwise reduction in amplifier gain. The effective thresholds of amplifier 32 in a four-step sequence are indicated by the dashed voltage levels on the plot of waveform S' in Fig. 5. The use of four steps is illustrative only. Any even number of steps may be employed without modification of the basic principles or components of the device.

On step 1, amplifier 32 passes signal at all ranges or times between $r_1$ and $r_8$ as shown in Fig. 5. The output of amplifier 32 is, therefore, proportional to and similar in shape to waveform S'. This assumes that the optional integrator 31 is used. The integrator acts to filter out rapid variations in echo intensity with range thus making the signal applied to limiter 35 more truly similar to the schematic envelope waveform S'. From the amplifier 32 signal is passed to the limiter 35 where it is amplified and clipped to give waveform A' as a resultant output. The limiter output is then passed through switch 41 which may be any suitable type of two position switch, such as an electronic switch, which can be synchronized with the changes in output of the step threshold bias control generator 34. The limiter output is fed by the switch 41 alternately to the storage device or delay line 45 on all odd steps and to the inverter amplifier 46 on all even steps of the output of step threshold bias control generator 34. The storage time of the storage device or delay line 45 is equal in duration to the period of the steps of the step bias voltage. When used with a radar system this would also be equal to the pulse repetition period of the basic radar or an integral multiple thereof.

Thus, on step 1, the output of limiter 35 would be delayed the duration of one step, and would come out of the storage or delay device 45 similar to waveform A' but delayed by one whole step duration. While the step 1 output is being stored or delayed, the threshold of amplifier 32 has jumped to step 2 so that signal passes through it only between ranges $r_2$ and $r_7$ as seen in Fig. 5. After squaring and limiting by limiter 35, the second step signal is passed through switch 41 to inverter amplifier 46 so that the output of amplifier 46 appears as a negative going signal waveform B' of Fig. 5. The step 2 output of inverter amplifier 46 is then synchronized with the delayed step 1 output of the storage or delay device 45. These two outputs, A' and B', are then added in mixer 49 to give waveform C' as a signal input to the final display device 47 which may be the same as that shown in Fig. 1b. Waveform C' is positive only between ranges $r_1$ and $r_2$ and between $r_7$ and $r_8$; i. e. between the ranges at which the input signal waveform S' exceeds the step 1 threshold but does not exceed the step 2 threshold.

In a similar manner, waveform D' is the positive signal output of the storage or delay device 45 corresponding to step 3 threshold and waveform E' is the negative signal output of inverter amplifier 46 corresponding to the step 4 threshold. The sum of waveforms D' and E' produces waveform F' which goes to the display device 47. Waveform F' is positive between ranges $r_3$ and $r_4$ and between $r_5$ and $r_6$; i. e., between the ranges at which the input signal waveform exceeds the step 3 threshold but does not exceed the step 4 threshold.

As the radar beam scans through the region of targets such as the storm or cloud, for example, and the display beam of the plan position indicator rotates synchronously, the display is alternately energized by a waveform similar to C' representing all regions in the storm from which the echoes fall between the step 1 and step 2 thresholds, and then by a waveform similar to F' representing all regions in the storm from which the echoes fall between the step 3 and 4 thresholds. The resulting plan position display is similar to P' in Fig. 5 where the outer white band represents the lowest class of echo intensity, the next inner dark band represents the next higher class of echo intensity, and so forth. The boundary lines between the alternate white and dark bands are equiecho contour lines which present a contour map of storm intensity.

In the system of Figs. 3 and 5, it is assumed only that the antenna beam rotates slowly enough and that the P. R. F. is high enough so that the input signal to amplifier 32 changes only negligibly between consecutive steps.

The step threshold control bias generator 33 and amplifier 32 of the system of Fig. 3 may, by way of illustration, take the form shown in schematic detail in Fig. 3a. The pulse repetition frequency trigger of the radar system is first counted down by a ratio of 4:1 by a blocking oscillator or other count down circuit to trigger a sawtooth generator. The sawtooth output is then applied to the grids of $V_1$, $V_2$, and $V_3$ which are on-off trigger tubes, i. e., they conduct fully or not at all. $V_1$ is biased to $E_a$, $V_2$ to $E_b$, and $V_3$ to $E_c$. The bias of the tube $V_4$ of amplifier 32 is determined by the voltage drop through $R_{11}$ and self biasing resistor $R_{12}$. On step #1 neither $V_1$, $V_2$, nor $V_3$ conducts and the bias on $V_4$ is self bias only. When the grids of $V_1$, $V_2$, and $V_3$ reach voltage $E_a$ tube $V_1$ fires thus stepping the bias on $V_4$ to step #2 by the drop through $R_{11}$. Similarly steps #3 and #4 occur when the sawtooth passes through $E_b$ and $E_c$ respectively, and the cycle starts again at step #1 when the sawtooth voltage drops down thus again cutting all three tubes off. The size of the steps may be varied by varying either $R_{11}$ or the B+ supply. The steps may be made equal or different in amplitude by adjusting $R_{13}$, $R_{14}$ and $R_{15}$.

The electronic switch 41 and delay line 45 of Fig. 3 may, by way of example only, take the form shown in Fig. 3b. The pulse repetition frequency trigger of the radar system is first counted down by a ratio of 2:1 by any suitable count down circuit and then used to trigger the multivibrator 48 whose square output then has a period equal to two pulse durations or periods of the radar as shown in Fig. 3b. The multivibrator cathode voltages are then used to bias tubes $V_{41a}$ and $V_{41b}$ to cut them off on alternate steps, $V_{41a}$ being shown as cut off on odd steps. Video signal is thus passed to inverter amplifier 46 on even steps by switch 41. It should be noted that inverter amplifier 46 is necessary only if the output of the delay channel is of the same polarity as the output of tube $V_{41a}$. If there is inversion in the delay channel, amplifier 46 can be omitted. A mixer 49 may be used to add the delayed and undelayed signals which are then fed to the display device 47. The delay line 45 may be of any standard type such as that shown in U. S. Patent No. 2,480,038 to Mason for example. The limited video output from tube $V_{41b}$ is used to modulate an I. F. oscillator which may have a frequency of 5 mc./sec. The modulated I. F. is then applied to an electromechanical transducer T which applies the energy to the rear end of the line which is cut to have a delay equal to the pulse period. The delayed energy is picked up by an electromechanical transducer receiver R, passed through an I. F. amplifier, detected, and the delayed video further amplified if necessary before being mixed with the undelayed signal of opposite polarity. The delayed I. F. signal is adjusted by the I. F. gain control so that the video output of the delayed block is equal in amplitude to the undelayed video. In order that the delay be exactly equal to the pulse period, the primary P. R. F. generator of the radar system may be another delay line system so that both delays may be affected equally by temperature effects.

Fig. 4 shows a modification of the system of Fig. 3 in which integrator 31, amplifier 32, step threshold generator 33, and limiter 35 have the same functions as in Fig. 3. The switch 41 and delay line 45, however, are replaced by the elements shown within block 9 of Fig. 4. Here the delay line is replaced by a storage tube 60 and its associated circuits. There are a large variety of such tubes, some with separate writing and erasing guns, some with built in viewing tubes for display of the final picture. Many are described in the book "Storage Tubes and Their Basic Principles" by Knoll and Kazan, John Wiley and Sons, New York, 1952. The exact details of block 9, in Fig. 4 would vary with the type of tube employed, but by way of illustration Fig. 4a shows the circuit for a Radechan Storage Tube as described more fully on pages 61–65 of the referenced book. Briefly, this tube has the property of giving an output signal which is the difference of signal voltage applied to the respective target elements (as the beam scans along a line of such elements) during one scan as compared to the signal voltage applied during the last previous scan. The output is positive if the present scan voltage exceeds the previous scan voltage. The limited video input to the storage tube is shown in the waveform plot for the four gain steps. The storage tube acts to subtract step 1 input from step 2 input, step 2 from step 3, etc. These would be negative signals and therefore require inversion by inverter 61. In order to obtain alternate dark and light bands it is also necessary to cut off the output on the odd steps as shown by the waveforms of Fig. 4b. The output of the multivibrator 62, operated via a 2:1 count down circuit 63, from the P. F. R. trigger, starts the switch tube 64 so that any positive signal from the inverter is shorted to ground thus producing the final signal going to the display as shown by the bottom waveform. The storage tube 60 comprises basically a cathode $k$, an accelerating anode $a$, collectors $g$, barrier grid $s$, insulated target $t$, and backplate $p$. The supply voltages shown produce a primary electron current $i_p$ which in turn gives rise to collector currents $i_c$ which are controlled by the signal inputs on consecutive steps so as to give an output representing the difference of consecutive signal inputs, all as more fully described in the above referenced book.

It is also obvious that many modifications of the system are possible. For example, the sequential stepping and delay devices of Figs. 3 and 4 could be designed for use in the I. F. amplifier of the radar unit before detection. The step threshold control could be applied to one of the first I. F. stages and the signal output then sent through two parallel channels only one of which had a delay line therein. The delayed and undelayed signals would then be subtracted as before and passed through the rest of the unit to the display device which may be the same as that shown in Fig. 1b. Furthermore, all of the variations of the system may use the time sensitivity control circuit mentioned in connection with Fig. 1 to produce a contour map which is independent of range error and a function of target reflectivity only.

The duration of each step may also correspond to a complete revolution or oscillation of the radar antenna and display beam rather than to a single pulse. In this case the step threshold control bias generator 33 and the switch 41 may be electromechanical devices. In this case, step 1 would occur during the first scan of the beam through the reflecting region and signals would be stored on a storage display device throughout the area corresponding to the region in the storm from which the received echo signals exceed the step 1 threshold. Step 2 threshold would occur on the next scan of the beam through the reflecting region and the signals would be made to erase the previously stored signals wherever the reflected echo signals exceed step No. 2 threshold by having the switch 41 switch the output of limiter 35 from "write" to "erase." Thus, after the second scan the display is left only with a band of signals representing the region in the storm returning echos between thresholds 1 and 2. On the next two scans of the antenna, another band of signals is laid down in the area on the display corresponding to the region from which echo signals lie between thresholds 3 and 4. Regions having echoes in the class between thresholds 2 and 3 or in excess of threshold 4 remain as areas of zero signal, usually darkness, surrounded by the other bands.

It is thus seen that I have provided an improved and simplified radar storm contour mapping device the foregoing description of which is intended to be merely illustrative of the presently preferred embodiment whereas the scope of the invention is intended to be defined by the appended claims.

What I claim is:

1. A radar system for plotting a two dimensional contour map of the geographical distribution of storm intensities comprising, means to transmit electromagnetic signals, means to receive reflected signals, means to orient said transmitting and receiving means in a predetermined direction, a visual display device having a writing beam, means to control the angle of sweep of said writing beam in accordance with the orientation of said receiving means, and input terminal connected to means for controlling the intensity of said writing beam in accordance with signal intensity, an amplifier-limiter channel connected between said receiving means and the input to said beam intensity controlling means, first means independent of said amplifier-limiter channel for generating a control voltage, means applying said control voltage to a portion of said amplifier-limiter channel as a bias so as to cause said channel to pass signal to said visual display means in response only to input signals within one boundary of a two-boundary predetermined class of signal intensity levels, second means to cause said amplifier-limiter channel to pass signal to the input terminal of said visual display means in response only to input signals within the second boundary of said two-boundary class, said visual display device including means to display said signal applied to said intensity control input terminal in the form of isoecho intensity contour lines corresponding to the two boundaries of said predetermined class of signal intensity levels.

2. Apparatus as in claim 1 including means connected between said receiving means and said amplifier-limiter channel for amplifying said reflected signals by a factor which is directly proportional to the distance from which said signals have been reflected.

3. Apparatus as in claim 1 wherein said first independent means for generating a control voltage comprises a second amplifier-limiter channel connected in parallel with the first said channel and having a higher threshold of detectability, the output of said second limiter stage being applied to the limiter stage of said first channel as a gate to determine the upper level of signal intensity which said first channel will pass and wherein said second means comprises a bias adjustment for said amplifier-limiter channel which bias is preset to determine the lower threshold of detectability of said channel.

4. Apparatus as in claim 1 wherein said first independent means for generating a control voltage comprises a step signal generator the output of which is applied to the amplifier of said amplifier-limiter channel as a bias to sequentially change its lower threshold of signal detectability, and wherein said second means comprises means to feed the output of said amplifier-limiter channel to a switch the operation of which is synchronized with the changes in output of said step signal generator, said switch connecting during one step of the signal generator with a storage means which delays the signal for at least the duration of one step, and said switch connecting during the next step of the step signal generator with an inverter amplifier, the output of said storage means and said inverter amplifier being added and impressed on the input terminal of the intensity control means of said display device.

5. Apparatus as in claim 1 wherein said visual display device is preceded by a signal storage means and wherein said first means for generating a control voltage comprises a step signal generator the output of which is applied to the amplifier of said amplifier-limiter channel as a bias to sequentially change its lower threshold of signal detectability, and wherein said second means comprises means to feed the output of said amplifier-limiter channel to said storage device, said storage device being of such a type as to indicate the difference of signal intensity of consecutive steps, and means for shorting out the output of said storage device on alternate steps.

6. An electrical circuit for separating discrete classes of signal intensities comprising, a plurality of amplifier-limiter channels in paired relation and connected in parallel to a common input for said signal, there being at least one such pair of channels, each of said channels having different thresholds of detectability with the channels in each pair having adjacent thresholds of detectability, means in the channel having the greater threshold of detectability in each pair for producing a bias gate from the signal therein, means utilizing said bias to gate the other channel of said pair, and means for connecting an output circuit to the gated channel of each pair.

7. In an electrical circuit for separating discrete classes of signal intensities, the combination of a plurality of amplifier-limiter channels in paired relation, said channels being connected in parallel to a common input for said signal, each channel having an amplifier stage and a limiter stage connected in cascade therein; the limiter stage of one channel of each pair including a means for producing a gate voltage which is applied to the other of said pair of channels, said bias being of sufficient magnitude to cause the output of the gated channel to oppose the output which it is made to have by its own input signal; means for connecting an output circuit to said gated channel of each pair; the amplifier of each channel having a predetermined threshold of signal detectability different from that of any other channel; the value of the threshold level of the gate producing channel of each pair being immediately above that of the gated channel of said pair in the increasing sequence formed by the values of said different predetermined thresholds of signal detectability, whereby signal is passed by the gated channel of each pair only when the signal at said common input terminal has a value which is within the range of values bounded by the respective predetermined thresholds of signal detectability of the amplifiers of said pair.

8. An electrical circuit for separating discrete classes of signal intensities comprising, an amplifier-limiter channel, means for sequentially altering the bias of said amplifier in stepwise fashion so as to change its threshold of signal detectability during consecutive periods of time, means connecting the output of said amplifier-limiter channel to a storage device during one said period of time and to an inverter amplifier during another said period of time, and means for connecting said storage means and said inverter amplifier in parallel to an output circuit.

9. An electrical circuit for separating discrete classes of signal intensities comprising, an amplifier-limiter channel, means for sequentially altering the bias of said amplifier in steps so as to change its threshold of signal detectability during consecutive periods of time, means for connecting the output of said amplifier-limiter channel to a network having an output proportional to the difference of signal input thereto of two succeeding said steps.

10. In a radar system an electrical circuit for separating discreet classes of signal intensities comprising, an amplifier channel, means for sequentially altering the bias of said amplifier in steps so as to change its threshold of signal detectability during consecutive periods of time, such periods corresponding to an integral number of scan cycles of the antenna beam of said radar, a recording storage type display device, means for causing the signal output of said amplifier to "write" signal on the storage display device on odd numbered threshold steps and for causing said signal output to "erase" part of the previously stored signal on even numbered threshold steps, whereby the signals remaining for display at the end of a step sequence are concentric bands corresponding to the signals between the odd numbered step thresholds and the next higher adjacent even numbered thresholds, and means for erasing all the stored signals prior to the start of the next sequence.

11. An electrical circuit for separating discrete classes of signal intensities comprising an amplifier-limiter channel and an output circuit; first means independent of said amplifier-limiter channel for generating a control voltage, means applying said control voltage to a portion of said amplifier-limiter channel as a bias so as to cause said channel to pass signal to said output circuit in response only to input signals within one boundary of a two-boundary predetermined class of signal intensity levels; and second means to cause said amplifier-limiter channel to pass signal to said output circuit in response only to input signals within the second boundary of said two-boundary predetermined class of signal intensity levels.

12. A radar system for plotting a two dimensional contour map of the geographical distribution of storm intensities comprising means to transmit electromagnetic signals, means to receive reflected signals, a visual display device, means for applying the received signal to said visual display device, said means including an amplifier limiter channel and a means for generating the control voltage, means for applying said control voltage to a portion of said amplifier limiter channel as a bias so as to cause said channel to pass signals to said display device only when said received signal is within one boundary of a two boundary predetermined class of signal intensity levels and a second means to cause said amplifier limiter channel to pass signals to said display device only when said received signal is within the second boundary of said two boundary predetermined class of signal intensity levels.

References Cited in the file of this patent

UNITED STATES PATENTS

| | | |
|---|---|---|
| 2,422,334 | Bedford | June 17, 1947 |
| 2,619,633 | Boario | Nov. 25, 1952 |
| 2,639,423 | Sherr | May 19, 1953 |